United States Patent
Bemis et al.

(10) Patent No.: US 7,214,332 B2
(45) Date of Patent: May 8, 2007

(54) FLAME-RESISTANT-THERMOSET COATING

(75) Inventors: Peter F. Bemis, Sheboygan, WI (US); James Giatras, Elkhart Lake, WI (US); Larry Engel, Sheboygan, WI (US); Daniel Cykana, Hingham, WI (US); Kurt Foth, Sheboygan, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 506 days.

(21) Appl. No.: 10/239,451

(22) PCT Filed: Mar. 22, 2001

(86) PCT No.: PCT/US01/40350

§ 371 (c)(1),
(2), (4) Date: Jan. 3, 2003

(87) PCT Pub. No.: WO01/70889

PCT Pub. Date: Sep. 27, 2001

(65) Prior Publication Data

US 2004/0007696 A1    Jan. 15, 2004

Related U.S. Application Data

(60) Provisional application No. 60/191,395, filed on Mar. 22, 2000.

(51) Int. Cl.
C09K 21/00 (2006.01)
C09K 21/14 (2006.01)

(52) U.S. Cl. .................. 252/606; 252/601; 523/179

(58) Field of Classification Search ............... 523/205, 523/452, 179; 252/601, 606
See application file for complete search history.

(56) References Cited

U.S. PATENT DOCUMENTS

| | | | |
|---|---|---|---|
| 2,676,162 A | 4/1954 | Marotta | |
| 3,663,267 A | 5/1972 | Moran et al. | |
| 3,702,841 A | 11/1972 | Sawko | |
| 3,864,883 A * | 2/1975 | McMarlin | 52/220.8 |
| 3,955,987 A * | 5/1976 | Schaar et al. | 106/18.15 |
| 4,026,810 A * | 5/1977 | Bost | 252/606 |
| 4,104,433 A * | 8/1978 | Kirk et al. | 442/146 |
| 4,122,203 A | 10/1978 | Stahl | |
| 4,195,115 A * | 3/1980 | Downing et al. | 428/482 |
| 4,198,328 A | 4/1980 | Bertelli et al. | |
| 4,210,452 A * | 7/1980 | Nicholson et al. | 106/18.18 |
| 4,405,761 A | 9/1983 | Rodgers et al. | |
| 4,442,157 A | 4/1984 | Marx et al. | |
| 4,879,320 A | 11/1989 | Hastings | |
| 4,945,015 A * | 7/1990 | Milner et al. | 523/179 |
| 4,964,890 A * | 10/1990 | Reuter et al. | 96/14 |
| 5,053,077 A | 10/1991 | Crompton | |
| 5,194,198 A | 3/1993 | von Bonin et al. | |
| 5,225,464 A | 7/1993 | Hill, Jr. | |
| 5,382,387 A | 1/1995 | von Bonin | |
| 5,397,643 A | 3/1995 | von Bonin et al. | |
| 5,401,793 A | 3/1995 | Kobayashi et al. | |
| 5,543,444 A * | 8/1996 | Kobayashi et al. | 523/205 |
| 5,596,029 A * | 1/1997 | Goebelbecker et al. | 523/179 |
| 5,639,808 A * | 6/1997 | Coggio et al. | 523/452 |
| 5,719,199 A | 2/1998 | Wallace et al. | |
| 5,723,515 A | 3/1998 | Gottfried | |
| 5,925,457 A | 7/1999 | McGinniss et al. | |
| 5,948,834 A | 9/1999 | Schneider | |
| 5,962,603 A | 10/1999 | Qureshi et al. | |
| 5,968,669 A | 10/1999 | Liu et al. | |
| 6,031,040 A | 2/2000 | Horacek | |
| 6,632,442 B1 * | 10/2003 | Chyall et al. | 424/400 |
| 6,797,200 B2 * | 9/2004 | Scelza et al. | 252/601 |

FOREIGN PATENT DOCUMENTS

EP    0 195 496 A    9/1986

* cited by examiner

*Primary Examiner*—Sharon E. Kennedy
(74) *Attorney, Agent, or Firm*—Michael Best & Friedrich, LLP

(57) ABSTRACT

A thermosetting-resin-based coating that is capable of forming a substantially flame-resistant barrier upon being exposed to heat. The coating includes a thermoset resin, an acid catalyst having a pKa value of less than 2, a filler selected from glass, mica, talc, perlite, vermiculite and combinations thereof, and an organic-intumescent material. The thermoset coating is at least 75% of the total weight of the coating.

22 Claims, 2 Drawing Sheets

Figure 1

| Test ID# | Sample Weight | | Grams | % | Sample Weight | % Barrier | % Smoke Density | % Max Smoke Density |
|---|---|---|---|---|---|---|---|---|
| Control | 29.23333 | | | | 29.23333 | 0.00% | 25.7% | 59.7% |
| | 29.1 | | | | Plain Thickness | | 21% | 59% |
| | 29.3 | | | | 0.06 | | 35% | 55% |
| | 29.3 | | | | Cured Thickness | | 21% | 65% |
| | 29.3 | | | | 0.06 | | 9% | 40% |
| Example 1 | 28.62 | Resin 12653 | 29.72 | 84.9% | 39.57 | 26.91% | 11% | 20% |
| | | Catalyst 86.97 | 1.78 | 5.1% | Plain Thickness | | % Better Than Control Burn | |
| | | | | | 0.06 | | | |
| | | 220-50A Exp Graphite | 3.5 | 10.0% | Cured Thickness | | | |
| | | | | | 0.085 | | | |
| Example 2 | 31.63 | Resin 12653 | 29.72 | 45.2% | 40.41 | 21.97% | 7% | 14% |
| | | Catalyst 86.97 | 1.81 | 2.8% | Plain Thickness | | | |
| | | GF300M | 3.54 | 5.0% | 0.06 | | | |
| | | Carbon Black | 0.12 | 0.2% | Cured Thickness | | | |
| | | ATH | 0.42 | 0.6% | 0.098 | | | |
| | | FRC-EX4 | 0.36 | 0.5% | | | | |
| Example 3 | 31.89 | Resin 12653 | 29.72 | 81.3% | 40.93 | 22.09% | 6% | 13% |
| | | Catalyst 86.97 | 1.81 | 5.0% | Plain Thickness | | | |
| | | GF300M | 3.54 | 9.7% | 0.06 | | | |
| | | Carbon Black | 0.12 | 0.3% | Cured Thickness | | 29% | |
| | | ATH | 0.42 | 1.1% | 0.085 | | | |
| | | FRC-EX4 | 0.36 | 1.0% | | | | |
| | | Exolit AP 422 | 0.59 | 1.6% | | | | |

Figure 2

| Formula# | Example 1 | Example 2 | Example 3 |
|---|---|---|---|
| Time To Break During Burn | 00:37.4 | 19:18.2 | 25:36.1 |

Figure 3

| Example 3 | Parts | Percent |
|---|---|---|
| Resin 12653 | 100 | 81.3% |
| Catalyst 86.97 | 6.1 | 5.0% |
| GF300 Glass Flake | 11.9 | 9.7% |
| Carbon Black | 0.4 | 0.3% |
| ATH | 1.4 | 1.1% |
| FRC-EX4 | 1.2 | 1.0% |
| Exolit AP 422 | 2 | 1.6% |

Heat Insulation

| | 4 Minute Top Surface Temp | Time to Maximum |
|---|---|---|
| Steel | 782° | 2 minutes |
| Example 3 | 523° | 4 minutes |

FLAME-RESISTANT-THERMOSET COATING

CROSS-REFERENCE TO RELATED APPLICATIONS

This application claims priority under 35 U.S.C. § 119 to provisional patent application No. 60/191,395 filed Mar. 22, 2000.

FIELD OF THE INVENTION

The invention relates to fire-resistant-thermosetting-intumescent coatings, raceway panels coated therewith and methods for improving the flame resistance of flammable substrates.

BACKGROUND OF THE INVENTION

Thermoplastic polymers are used in a wide variety of applications. For example, many office enclosures and office partitions use thermoplastic trim in place of wood and metal. Also, conventional-office-panel systems include a thermoplastic portion or raceway holding wires such as electrical, computer and telephone wires. Because thermoplastics are high polymers that tend to soften and melt when exposed to heat, their use can be problematic, particularly in the event of a fire.

More particularly, when thermoplastic components are incorporated into an office enclosure or office partition and exposed to extreme heat, these components tend to burn, sag and burn-through. In turn, other components that are normally concealed by the thermoplastics, e.g. electrical wiring and other flammable items, can be exposed to flames. The results can be catastrophic. Further, burning thermoplastics tend to generate excessive amounts of smoke. Together the flames and smoke emanating from burning thermoplastics can pose significant health hazards to people in close proximity and make it difficult for such people to flee an internal fire. Potentially, the burn-through susceptibility of thermoplastics can cause severe structural damage and even death.

As a result, coatings that can be applied to thermoplastics and other flammable substrates to achieve flame-resistant and heat-resistant effects, while also reducing smoke emanating therefrom, are desired.

SUMMARY OF THE INVENTION

The present invention provides a thermosetting-resin-based coating comprising a thermoset resin, an acid catalyst having a pKa value of less than 2, a filler selected from glass, mica, talc, perlite, vermiculite and combinations thereof and an organic-intumescent material. The thermoset resin is at least 75% of the total weight of the coating. The coating is substantially free of urea formaldehyde, melamine formaldehyde and epoxides and capable of forming a substantially flame-resistant barrier upon being exposed to heat.

The invention also provides a thermoset-resin-based coating comprising about 100 parts of a thermoset resin including a phenolic resin about 5–7 parts of an acid catalyst having a pKa value of less than 2, about 8–12 parts of a filler selected from glass, mica, talc, perlite, vermiculite and combinations thereof and about 1–1.5 parts of an organic-intumescent material. The coating is capable of forming a substantially flame-resistant barrier upon being exposed to heat.

The invention also provides method of improving the flame resistance of a substrate and reducing smoke generation therefrom when the substrate is exposed to fire. The method comprises admixing about 100 parts of a thermoset resin including a phenolic resin about 5–7 parts of an acid catalyst having a pKa value of less than 2, about 8–12 parts of a filler selected from glass, mica, talc, perlite, vermiculite and combinations thereof, about 1–1.5 parts of an organic-intumescent material, and about 1–5 parts of ammonium polyphosphate to form a coating. The method further comprises applying the coating to the substrate. The thermoset resin is substantially free of urea formaldehyde, melamine formaldehyde and epoxides. The coating is capable of forming a substantially flame-resistant-thermal barrier over the substrate when the coating is exposed to heat.

The invention further provides a raceway panel having a coating applied to a portion thereof, the coating comprising a thermoset resin, an acid catalyst, a filler and an intumescent material.

The invention also provides a method of making a thermosetting-resin-based coating. The method comprises admixing about 100 parts of a thermoset resin including a phenolic resin, about 5–7 parts of an acid catalyst having a pKa value of less than 2, about 8–12 parts of a filler selected from glass, mica, talc, perlite, vermiculite and combinations thereof, about 1–1.5 parts of an organic-intumescent material, and about 1–5 parts of ammonium polyphosphate to form the coating. The thermoset resin is substantially free of urea formaldehyde, melamine formaldehyde and epoxides, and the coating is capable of forming a substantially flame-resistant-thermal barrier over the substrate when the coating is exposed to heat.

DESCRIPTION OF THE DRAWINGS

FIG. 1 is a table depicting compositions, average-smoke density and maximum-smoke density for three coatings (Examples 1–3) embodying the invention that have been applied to a thermoplastic polymer and exposed to a propane flame for four minutes. The smoke density and maximum-smoke density of four uncoated-thermoplastic-polymer controls are also shown.

FIG. 2 is a table comparing the burn-through times for the three coatings (Examples 1–3) applied to thermoplastic polymers and exposed to a propane flame for four minutes.

FIG. 3 is a table showing the composition of the coating of Example 3.

Figure 4:
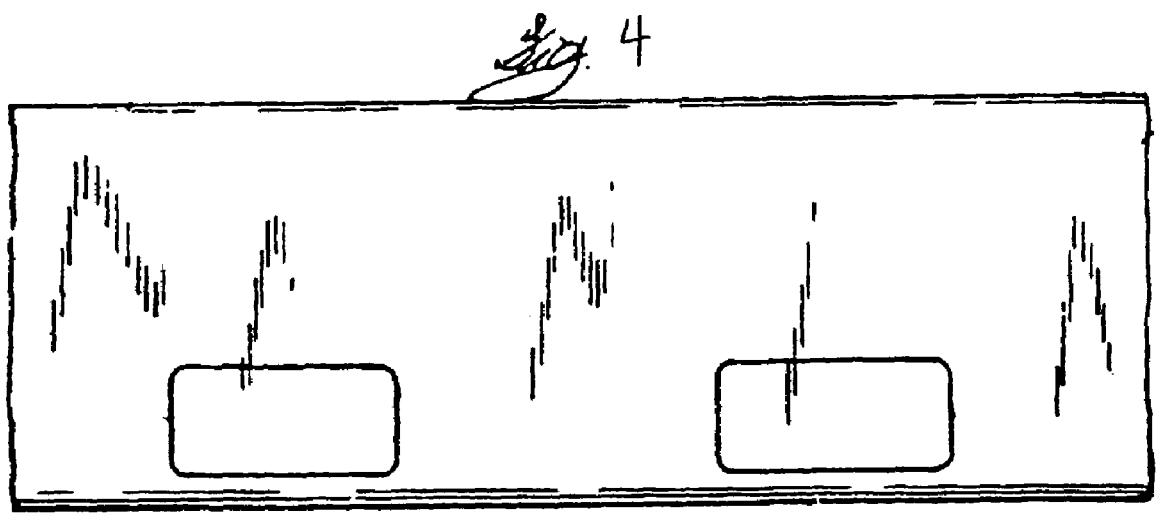
FIG. 4 is a front elevational view of a coating applied to a raceway panel.

Before the embodiments of the invention are explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

When the flame-resistant-liquid-thermosetting coatings, described below, are applied to a thermoplastic or other substrate, and the thermoplastic or other substrate is exposed to extreme heat, the thermosetting and intumescent properties of the coating together create an expanded "char" or thermal barrier that is generally resistant to ignition, and thereby tends not to generate smoke. The thermal barrier acts as a thermal insulator, thereby protecting the substrate to which it is applied from fire and heat. The combination of ingredients in the coating are easy to apply, and the coatings cure in a reasonable amount of time. Moreover, the coatings are economically attractive to extrusion and injection molding processes.

The thermosetting-resin-based coatings of the present invention comprise different combinations, in different ratios, of the ingredients described below.

Thermoset Resins

Thermoset resins are high polymers that solidify or set irreversibly when heated. Examples of thermoset resins include, but are not limited to, phenolics, epoxies or epoxides, aminos, silicons, urea formaldehyde, melamine formaldehyde and combinations thereof. Phenolic resins include several types of synthetic thermosetting resins obtained by the condensation of phenol or substituted phenols with aldehydes such as formaldehyde, acetaldehyde, and furfural. Phenol-formaldehyde resins are typical and constitute the chief class of phenolics.

The coatings described herein are thermoset-resin-based coatings. In other words, the thermoset resin is the base component for the coatings. Accordingly, the amount of each ingredient being added to form the coating composition is generally described relative to the thermoset resin. But the thermoset resin is generally greater than 75 percent by weight of the total end coating.

All of the above-identified thermoset resins, including combinations thereof, are suitable for use in the present invention, although phenolic resins are preferred. More particularly, Resin 12653 manufactured by Plastics Engineering Company, Sheboygan, Wis. is most preferred. Other phenol-formaldehyde-resol resins are also suitable for use with the present invention.

Acid Catalysts

In many cases, it may be necessary to add an acid catalyst (i.e. a curing agent) such as an organic peroxide or some form of sulfur in order to induce the thermosetting properties of the above-described resins. Thus, the coating may be formulated with a curing agent that cures at room temperature, or high ambient temperatures, in a reasonable amount of time, e.g., two to five minutes. Preferred acid catalysts are those having a pKa of less than two. Examples of such acid catalysts include, but are not limited to, perchloric acid, hydriodic acid, hydrobromic acid, sulfuric acid, hydrochloric acid, nitric acid, sulfurous acid, phosphoric acid and nitrous acid. A highly preferred acid catalyst is sulfonic acid. Also, Catalyst 12653 manufactured by Plastics Engineering Company in Sheboygan, Wis. is also highly preferred. Preferably, five to seven parts of catalyst are added per hundred parts of thermoset resin.

Fillers

Filler material is added as a way to further enhance the flame resistance of the final coating. More particularly, the filler acts as a vehicle around which the intumescent material (described below) can expand as it forms a char with the other ingredients in the coating upon being exposed to extreme heat. Examples of filler material include, but are not limited to, glass flake, milled glass flake, mica, large flake mica, perlite, glass fibers, glass beads, talc and vermiculite. A highly preferred filler is GF 300 GLASSFLAKE™ manufactured by Glassflake Limited, Leeds West, United Kingdom, which comprises 300 micron glass flake or boron silicate. Preferably, the thermoset coating generally comprises 8–12 parts of filler per hundred parts of thermoset resin.

Intumescent Materials

The flame-resistant coating further comprises intumescent materials. Intumescence is characterized by foaming, swelling or expansion of a material when exposed to heat. A wide variety of intumescents can be employed in the coating. While both organic- and inorganic-intumescent materials can be used with the coating, organic-intumescent materials are preferred. For example, expandable graphite such as GRAFGARD™ manufactured by UCAR can be used as an intumescent material which expands when exposed to heat. In addition, FRC-EX4™ manufactured by FRC PyroTech, Addison, Ill. can also be used in the coating. FRC-EX4™ comprises carbonific source, ammonium polyphosphate and carbon dioxide blowing agent. Upon being exposed to heat, the intumescent materials in the coating expand and ultimately form a char with the thermoset resin and other materials around the filler described above. This char acts as thermal barrier which protects the substrate to which the coating has been applied from fire. The end-thermoset coating preferably comprises 1–2 parts intumescent material per hundred parts of the thermoset resin.

Char Promoters

Other ingredients may be added to the coating in order to promote charring and enhance the structural integrity of the thermal barrier that forms when the coating is exposed to heat. In other words, certain ingredients tend to facilitate the formation of the thermal barrier, and also increase the flame and heat resistance thereof as well as decrease the amount of smoke that is generated as the thermal barrier is exposed to heat or flame. Examples of char promoters include, but are in no way limited to, carbon black and fumed silica. As part of the coating, these char promoters have been found to improve the structure of the thermal barrier. They also act to accelerate the curing of the thermoset resin. Adding carbon block in a ratio of 0.2–1 parts per 100 parts of thermoset resin has been found to be most effective. Ammonium polyphosphate is another example of a char promoter which improves the structural integrity of the thermal barrier which forms from the flame-resistant coating. EXOLITE AP 422™, manufactured by Clariant Corporation, Charlotte N.C., comprises ammonium polyphosphate and acts as a suitable char promoter in the coating. Adding 1–5 parts of ammonium polyphosphate per 100 parts thermoset resin is most preferred.

Flame and Smoke Retardants

Other flame and smoke retardants that are well-known in the art can also be used in the coating. For example, aluminum trihydrate (ATH) is a known flame retardant that can be added to the coating to enhance synergy and viscosity control. Up to 2 parts of aluminum trihydrate (ATH) per 100 parts of thermoset resin can be added. But adding too much flame and smoke retardant can affect the cure rate of the coating.

EXAMPLES

Three different coatings embodying the invention were applied to separate thermoplastic polymers and separately tested against control-thermoplastic polymers having no coating applied thereto. More particularly, the average-smoke density, maximum-smoke density and burn-through of thermoplastics with and without these coatings were tested. FIG. 1 shows the results of these tests as well as the compositions of each coating being applied to the thermoplastics. The three tested coatings are described below in Examples 1–3.

Thermoplastic Controls

Initially, four different thermoplastic polymers having no protective coatings applied thereon were subjected to a propane flame for four minutes. The propane flame emanated from a bunsen burner directed at the thermoplastic at a 45° angle. Typically, a burn-through at the point of flame secured within one minute of the four-minute-test procedure. The four control-thermoplastic polymers weighed 29.1 grams, 29.3 grams, 29.3 grams and 29.3 grams, respectively. The average weight for the control thermoplastic was 29.23 grams. While the thermoplastic-polymer controls were being subjected to the propane flame for four minutes, the smoke density and maximum-smoke density was measured for each control. Smoke density is a measurement of the average-smoke density over the course of the four minute test. Maximum-smoke density is the peak smoke density during the four minute test. Subsequently, an average for each measurement was taken. The average-smoke density for the four controls was 25.7%, while the maximum-smoke density percentage average of the four controls was 59.7%.

The following three coatings described in Examples 1–3, respectively, were tested in the same manner as the control-thermoplastic polymers, and the smoke density, maximum-smoke density and burn-through were compared. The coating in each example was mixed at ambient temperature and normal pressure. Increasing the temperature and pressure can force the coatings to cure at a faster rate. Mixing of the components to form the coatings can be effectuated by a variety of conventional means known in the art. But the coatings of the present examples were mixed using a slow paddle mixer until each coating was mixed to optimum dispersion.

Example 1

In the first example, 29.72 grams of a phenolic resin, namely Resin 12653 manufactured by Plastics Engineering Company, 1.78 grams of sulfonic acid, namely Catalyst 86.97 manufactured by Plastics Engineering Company and 3.5 grams of expandable graphite, namely GRAFGARD™ manufactured by UCAR, were mixed together to form the thermoset coating. The percentage by weight of each ingredient is shown in FIG. 1. The coating was then applied to a thermoplastic polymer using a doctor blade and subjected to the same burn test as described above with regard to the control. In other words, the coated segment was subjected to a Bunsen burner flame in a flame cabinet generally following ASTM-D 2843 procedure for four minutes at about 1100° Fahrenheit. The coatings embodying the invention can be applied to thermoplastic polymers or other substrates by a variety of different application methods as are well-known in the art. For example, doctor blades, brushes, sprayers and any other capable means of applying a coating can be used to coat the substrates.

The coating of Example 1 exhibited an 11% smoke density average over the four minute burn test, and a maximum-smoke density of 20%. Compared to the average control thermoplastic, the coating of Example 1 showed a 43.10% improvement in terms of average-smoke density, and a 44.44% improvement in terms of maximum-smoke density. The burn-through time for each example was also measured, and charted in FIG. 2. Burn-through time is a measurement of the amount of time it takes for a flame to "break" the sample or otherwise "burn-through" the sample. FIG. 2 shows the coating of Example 1 exhibiting a 37.4 second burn-through time. Longer burn-through times are desirable.

Example 2

In Example 2, 29.72 grams of phenolic resin (Resin 12653) was mixed with 0.12 grams of carbon black using a slow paddle mixer. Subsequently, 0.42 grams of aluminum trihydrate (ATH) was added to the mix. Next, 0.36 grams of an intumescent material, namely FRC-EX4 manufactured by FRC Pyrotec, Addison, Ill., was mixed in with the resin. Finally, 3.54 grams of glass filler, namely GF300M manufactured by Glass Flake Limited, United Kingdom, was added to the coating, followed by 1.81 grams of a sulfonic acid catalyst (86.97 Catalyst). The percentage by weight of each ingredient is shown in FIG. 1. All these ingredients were mixed to optimum dispersion at ambient temperature and pressure.

While being exposed to a flame in the same manner as described above, the coating in Example 2 exhibited an average 7% smoke density and a 14% maximum-smoke density, resulting in a 72.73% and a 76.54% improvement, respectively over the average-control thermoplastic. The coating of Example 2 also exhibited a substantially improved burn-through time of 19 minutes and 18.2 seconds.

Example 3

In Example 3, 29.72 grams of a phenolic resin (Resin 12653) was mixed with 0.12 grams of carbon black using a slow paddle mixer. Subsequently 0.42 grams of aluminum trihydrate (ATH) and 0.36 grams of intumescent material (FRC-EX4), was added to the mix. Next, 0.59 grams of Exolit AP 422 manufactured by Clariont Corporation, Charlotte, N.C., comprising ammonium polyphosphate was added to the mix. Finally, 3.54 grams of glass flake (GF300M), and 1.81 grams of sulfonic acid catalyst (Catalyst 86.97) was added to the coating. The percentage by weight of each ingredient is shown in FIG. 1. Generally, the catalyst was added last to the mixture because the catalyst induces curing once it is added.

The coating of Example 3 exhibited a 6% average-smoke density over the course of the four-minute-burn test, and a 13% maximum-smoke density. Compared to the average-thermoplastic control, the coating of Example 3 demonstrated a 76.62% better average-smoke density and 78.21% better maximum-smoke density. The coating of Example 3 also exhibited an improved 25 minute 36.1 second burn-through time. Again, a longer burn-through time is desirable because it means that a substrate coated with the coating can be exposed to heat and flame for a longer period of time before it burns through. This is particularly desirable when the thermoplastic substrate is protecting or hiding other flammable objects, such as electrical wiring. FIG. 3 gives a more detailed description of the coating of Example 3.

The coatings described above can be used in virtually limitless applications. As previously described, the coatings can be used to coat a variety of thermoplastic polymers in a variety of different applications.

For example, the coating can be applied to portions of a conventional-office-panel system as well as to portions or raceways holding wires such as electrical, computer and telephone wires. U.S. Pat. No. 5,195,287 issued to Bruggink describes raceway panels, and is hereby incorporated by reference. FIG. 4 also illustrates a raceway panel coated with the above-described coatings. U.S. Pat. No. 5,195,287 describes an extruded panel comprising a layer of rigid PVC and a layer of flexible PVC. The layer of flexible PVC can be formed by a pair of generally parallel, spaced apart strips of flexible PVC extruded integrally with the layer of rigid PVC. The rigid PVC has therein an endless cut dividing the rigid PVC into a main portion and a cut-out portion, and the strips of flexible PVC connect the cut-out portion to the main portion and thereby hold the cut-out portion in place relative to the main portion. The cut-out portion preferably has a width substantially greater than the width of the flexible strips. The panel is extruded without the cut, and then a laser is used to provide the endless cut through the rigid PVC without cutting through the flexible PVC. Applying the coatings to raceways prevents burning of the electrical wires housed therein. Further fire damage can be limited if fire is prevented from burning through the thermoplastic polymer.

Similarly, the coating can be applied to thermoplastic trim, furniture, cubicles and fire walls in cars and tractors. The coating can also be applied to walls or panels, and other non-thermoplastic substrates. The coating can also be used as a core material in injection molding methods, and more particularly co-injection molding methods.

We claim:

1. A thermosetting-resin-based coating comprising:
   a thermoset resin;
   an acid catalyst having a pKa value of less than 2;
   a filler selected from glass, mica, talc, perlite, vermiculite and combinations thereof; and
   an organic-intumescent material,
   the thermoset resin being at least 75% of the total weight of the coating, and the coating being substantially free of urea formaldehyde, melamine formaldehyde and epoxides and capable of forming a substantially flame-resistant barrier upon being exposed to heat.

2. The coating of claim 1 further comprising aluminum trihydrate (ATH).

3. The coating of claim 1 further comprising carbon black.

4. The coating of claim 1 further comprising ammonium polyphosphate.

5. The coating of claim 4, wherein the coating comprises about 100 parts of the thermoset resin, about 5–7 parts of the acid catalyst, about 8–12 parts of the glass filler, about 1–1.5 parts intumescent material and about 1–5 parts of the ammonium polyphosphate.

6. The coating of claim 1, wherein the organic-intumescent material comprises FRC-EX4 manufactured by FRC PyroTech.

7. The coating of claim 1, wherein the catalyst comprises sulfonic acid.

8. A thermoset-resin-based coating comprising:
   about 100 parts of a thermoset resin including a phenolic resin; about 5–7 parts of an acid catalyst having a pKa value of less than 2;
   about 8–12 parts of a filler selected from glass, mica, talc, perlite, vermiculite and combinations thereof; and
   about 1–1.5 parts of an organic-intumescent material, the coating being capable of forming a substantially flame-resistant barrier upon being exposed to heat.

9. The coating of claim 8 further comprising about 1–5 parts of ammonium polyphosphate.

10. The coating of claim 9 further comprising 1–2 parts of aluminum trihydrate (ATH) and 0.2–1 parts of carbon black.

11. The coating of claim 8 further comprising aluminum trihydrate (ATH).

12. The coating of claim 8 further comprising carbon black.

13. The coating of claim 8, wherein the organic-intumescent material is FRC-EX4.

14. The coating of claim 8, wherein the catalyst comprises sulfonic acid.

15. The coating of claim 8, wherein the thermoset-phenolic resin is a phenol-formaldehyde-resol resin.

16. A method of improving the flame resistance of a substrate and reducing smoke generation therefrom when the substrate is exposed to fire, the method comprising:
   admixing about 100 parts of a thermoset resin including a phenolic resin about 5–7 parts of an acid catalyst having a pKa value of less than 2,
   about 8–12 parts of a filler selected from glass, mica, talc, perlite, vermiculite and combinations thereof,
   about 1–1.5 parts of an organic-intumescent material, and
   about 1–5 parts of ammonium polyphosphate to form a coating; and applying the coating to the substrate,
   wherein the thermoset resin is substantially free of urea formaldehyde, melamine formaldehyde and epoxides, and the coating is capable of forming a substantially flame-resistant-thermal barrier over the substrate when the coating is exposed to heat.

17. The method of claim 16, wherein the substrate is a thermoplastic.

18. The method of claim 17, wherein the substrate is a panel raceway for housing electrical wires.

19. The method of claim 16 which the substrate is a thermoplastic object formed by injection or co-injection molding.

20. A raceway panel having the coating of claim 1 applied to a portion thereof.

21. A raceway panel having the coating of claim 8 applied to a portion thereof.

22. A method of making a thermosetting-resin-based coating, the method comprising admixing about 100 parts of a thermoset resin including a phenolic resin about 5–7 parts of an acid catalyst having a pKa value of less than 2,
   about 8–12 parts of a filler selected from glass, mica, talc, perlite, vermiculite and combinations thereof,
   about 1–1.5 parts of an organic-intumescent material, and
   about 1–5 parts of ammonium polyphosphate to form the coating,
   the thermoset resin being substantially free of urea formaldehyde, melamine formaldehyde and epoxides, and the coating being capable of forming a substantially flame-resistant-thermal barrier over the substrate when the coating is exposed to heat.

* * * * *